United States Patent [19]
Codella

[11] Patent Number: 5,706,135
[45] Date of Patent: Jan. 6, 1998

[54] DIAMOND OPTICAL PLATE BEAMSPLITTER

[75] Inventor: Peter Joseph Codella, Schenectady, N.Y.

[73] Assignee: General Electric Company, Schenectady, N.Y.

[21] Appl. No.: 538,656

[22] Filed: Oct. 3, 1995

[51] Int. Cl.⁶ .................................................. G02B 27/14
[52] U.S. Cl. ........................................................ 359/629
[58] Field of Search ................................. 359/629, 634, 359/640

[56] References Cited

U.S. PATENT DOCUMENTS

| | | | |
|---|---|---|---|
| 4,948,629 | 8/1990 | Hacker | 427/53.1 |
| 5,225,926 | 7/1993 | Cuomo et al. | 359/350 |
| 5,273,731 | 12/1993 | Anthony | 423/446 |
| 5,536,943 | 7/1996 | Smith et al. | 250/372 |
| 5,552,675 | 9/1996 | Lemelson | 315/111.21 |

OTHER PUBLICATIONS

Brad Williams, "Diamond Optics: May Be an Engineer's Best Friend," Photonics Spectra, Nov. 1995, pp. 99–102.
Mark P. D'Evelyn et al., Article entitled, "Properties of CVD Diamond for Optical Applications," appearing in Applications of Diamond Films and Related Materials: Third International Conference, edited by A. Feldman et al., (NIST Special Publication 885, Washington, DC, 1995) pp. 547–550.

Primary Examiner—David C. Nelms
Assistant Examiner—Ricky Mack
Attorney, Agent, or Firm—Donald S. Ingraham

[57] ABSTRACT

A structurally robust beamsplitter that has substantially constant transmittance values over a wide range of wavelengths includes a freestanding monolithic synthetic polycrystalline diamond optical plate that has a thickness in the range of about 1 μm to about 1 mm. The optical plate further typically has a transmittance in the range between 55% and 75% for incident radiation over almost all wavelengths of radiation from the infrared to the visible. A beamsplitter in accordance with the present invention is readily adapted for use in a interferometric spectroscopy system, such as a system using infrared and far infrared radiation for spectroscopic analysis.

6 Claims, 4 Drawing Sheets

DIAMOND OPTICAL PLATE BEAMSPLITTER

BACKGROUND OF THE INVENTION

This invention relates generally to systems incorporating beamsplitters and in particular to beamsplitters used in interferometric spectroscopy devices using radiation in the near, mid and far infrared range.

Beamsplitters are devices that have the effect of deflecting a portion of radiation incident upon the device and allowing substantially all of the remaining radiation to pass through the device undeflected. Such devices are used in a number of applications, such as in interferometers in which it is necessary to split a beam of radiation to obtain constructive and destructive interference when the beam is superimposed on itself. In this manner it is possible to use broad band radiation to obtain a modulated beam with reproducible summation of different wavelengths at each point in the interferogram. Using monochromatic light, it is possible to make precise measurements of small variations, on the order of the wavelength of the monochromatic light, in the displacement of one of the reflecting members. The beamsplitter often is the critical element in determining the throughput characteristics of the interferometer, that is, the wavelength range over which the interferometer can provide accurate measurements.

Near, mid and far infrared spectrometers commonly use a Michaelson interferometer. As no one beamsplitter provides adequate performance over all of these wavelength ranges, it is common that at least three different beamsplitters are used to cover these ranges: for example, quartz beamsplitters are used in the near infrared; germanium on potassium-bromide (KBr) beamsplitters are used for in mid infrared; and a series of mylar film beamsplitters are used in the far infrared. Germanium on KBr beamsplitters are fragile and subject to degradation (e.g., increased opacity and diminished reflectivity) over time due to ambient moisture induced degradation of the optical surfaces and the like. Mylar film beamsplitters exhibit structural instability in that they vibrate in air currents caused by movement of the mirror in the interferometer resulting in oscillations in the mirror-to-beamsplitter distance, resulting in increased noise (and hence less sensitivity) of the interferometer. Mylar film beamsplitters further exhibit strong spectral absorption bands that result in noise and a limited spectral range. This characteristic necessitates the use of multiple elements (thicknesses), thereby increasing set-up and analysis time and introducing variability into sample analysis. Non-mylar film far infrared beamsplitters have been developed but typically exhibit distinct spectral features that limit their optical performance and typically further are fragile with the potential for structural degradation during normal handling.

It is desirable that a beamsplitter have a transmittance to reflectance ratio close to 50:50 over a wide range of frequencies with minimal intrinsic absorption of the radiation; be insensitive to atmospheric exposure, particularly moisture; and further that the beamsplitter be structurally robust.

SUMMARY OF THE INVENTION

A structurally robust beamsplitter that has substantially constant transmittance values over a wide range of wavelengths comprises a freestanding monolithic synthetic polycrystalline diamond optical plate. The plate typically has a thickness in the range between 1 µm and 1 mm. The monolithic diamond optical plate further typically has a transmittance in the range between 55% and 75% for incident radiation in the range between the infrared and into the visible range; in particular, transmittance is in this range for incident radiation having a wavenumber (that is, the reciprocal of wavelength measured in centimeters) in the range between about 100 and 25,000, except for a moderate to strong absorption band around 2100 wavenumbers. The beamsplitter typically comprises a first and a second surface disposed opposite to one another, the first and second surfaces having an area in the range between about 4 cm$^2$ and 50 cm$^2$, and being disposed at an offset angle (in the range between about 3° and 5°) with respect to the other such that less than about 10% of the incident radiation undergoes total internal reflection between the two surfaces.

A beamsplitter in accordance with the present invention is readily adapted for use in a interferometric spectroscopy system, such as a system using radiation in the infrared through visible range for spectroscopic analysis.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

A beamsplitter 100 (FIG. 1) comprises a free-standing monolithic synthetic polycrystalline diamond optical plate 105. As used herein, "free-standing" refers to a material having sufficient internal structural strength to maintain its form without external support. That is, optical plate 105 is held in place by a mechanical device that assures optical alignment; no support, however, be it tension, substrate, or otherwise, is necessary to retain the optical properties and characteristics of the polycrystalline diamond optical plate. "Monolithic" as used herein refers to the fact diamond optical plate 105 is composed of synthetic diamond material only (that is, a homogeneous diamond structure), without the necessity of another layer of material to which the diamond adheres. The diamond comprising optical plate 105 is synthetic, that is non-naturally occurring; the synthetic diamond is fabricated in a chemical vapor deposition (CVD) process, such as is described in U.S. Pat. No. 5,273,731, which is assigned to the assignee herein and incorporated herein by reference. The CVD process produces a synthetic polycrystalline diamond structure 107 (not drawn to scale are shown for illustrative purposes only) that can be formed with desired spatial dimensions (e.g., thickness and shape)

and crystalline alignment to provide the desired radiation transmission characteristics (e.g., optical clarity, reflectivity, and the like). To achieve the desired characteristics, typically CVD diamond structures used in fabrication of optical plates are further polished after fabrication to improve transmittance of radiation. The monolithic structure eliminates potential adverse optical characteristics that may result when multiple layers of material are employed in the structure of the beamsplitter.

Figure 2:
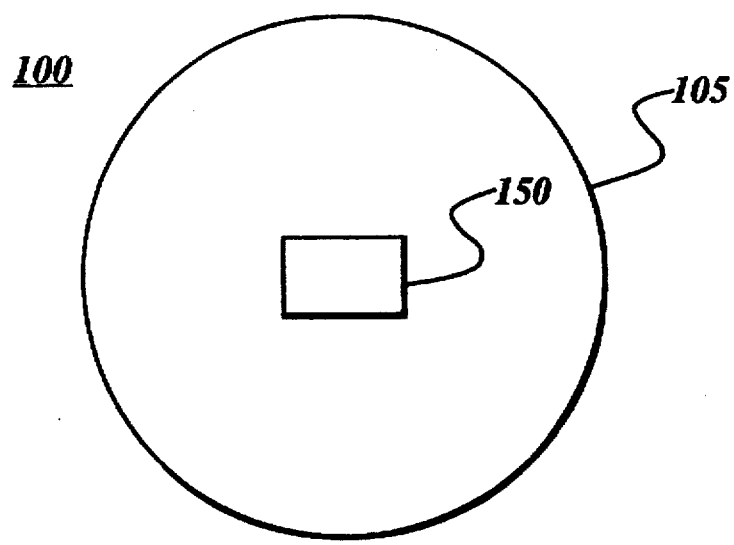
FIG. 2 is a plan view of a beamsplitter in accordance with the present invention.

Beamsplitter optical plate 105 has a thickness "T" in the range between about 1 µm and 1 mm (CVD diamond material of this thickness exhibits internal structural strength that makes the diamond film free-standing and provides the desired optical characteristics). Beamsplitter 100 further comprises a first surface 110 and a second surface 120 that are disposed opposite one another and form the faces of the beamsplitter through which the radiation of interest passes. First surface 110 and second surface 120 are disposed at an offset angle "A" with respect to one another. The offset angle is typically in the range between about 3° and 5° such that less than about 10% of the radiation incident on beamsplitter 100 undergoes total internal reflection within beamsplitter 100 (that is, incident radiation that enters the beamsplitter and is reflected between the first and second surfaces multiple times before passing from the beamsplitter). The shape of optical plate 105 is readily adapted to a number of applications; commonly a circular or elliptical shape (e.g., as illustrated in FIG. 2) is employed in interferometric spectroscopic systems, although rectangular or square shaped optical plates can be fabricated. The area of optical plate is in the range between about 4 cm$^2$ and 50 cm$^2$, and commonly in the range between about 10 cm$^2$ and 30 cm$^2$.

Figure 1:
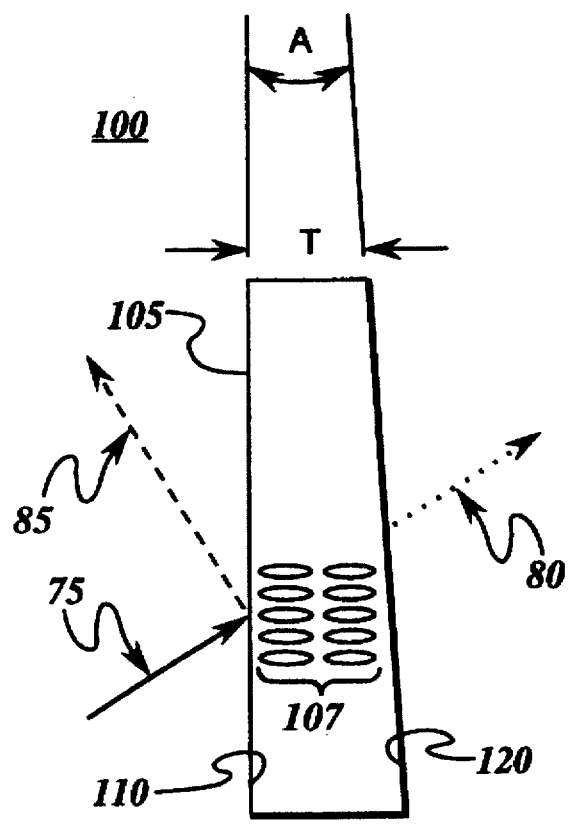
FIG. 1 is at cross-sectional view of a beamsplitter in accordance with the present invention.

In operation, incident radiation 75 is directed towards beamsplitter 100 so that it is incident on the face of optical plate 105. A direct path beam 80 and a deflected beam 85 pass from the opposite face of the optical plate. As shown in FIG. 1 for purposes of illustration and not limitation, incident radiation 75 is incident on first surface 110 and the transmitted portion of the beam passes from second face 120 along a direct beam path 80 passing along the same path as the incident beam; a portion of incident radiation 75 is reflected by optical plate 105 along deflected beam path 85, which is path offset about 90° from the incident beam path. In a beamsplitter application, the angle of incidence of radiation 75 on first surface 110 is aligned so that direct path beam 80 and deflected beam 85 are directed towards desired targets. Typically the angle of incidence of radiation beam 75 is about 45° with respect to the plane of first surface 110.

Beamsplitters comprising synthetic diamond optical plate in accordance with this invention provide effective transmission and deflection for incident radiation over a wide range of wavenumbers. The diamond material evidences only one significant absorption band, at about 2100 wavenumbers; at other wavelengths almost all of the incident radiation is either transmitted or reflected, thus providing beamsplitter effects at these other wavelengths. As noted above, beamsplitters desirably have a transmittance to reflection ratio of about 50:50 (that is, about 50% of the incident beam is transmitted along direct path 80 and about 50% of the incident beams is reflected along deflection path 85). Acceptable beamsplitter effect is provided by materials having transmittance to reflection ratios in the range of about 50:50 to about 75:25. Synthetic diamond optical plate provides a transmittance in the range between abut 65% and 75% for incident radiation having a wavenumber in the range between about 2100 and 25,000 (e.g., infrared through the visible spectrum), and a transmittance in the range between about 60% and 70% for radiation having wavenumbers in the range between about 100 and 2100 (infrared through the far-infrared spectrum).

Figure 4:
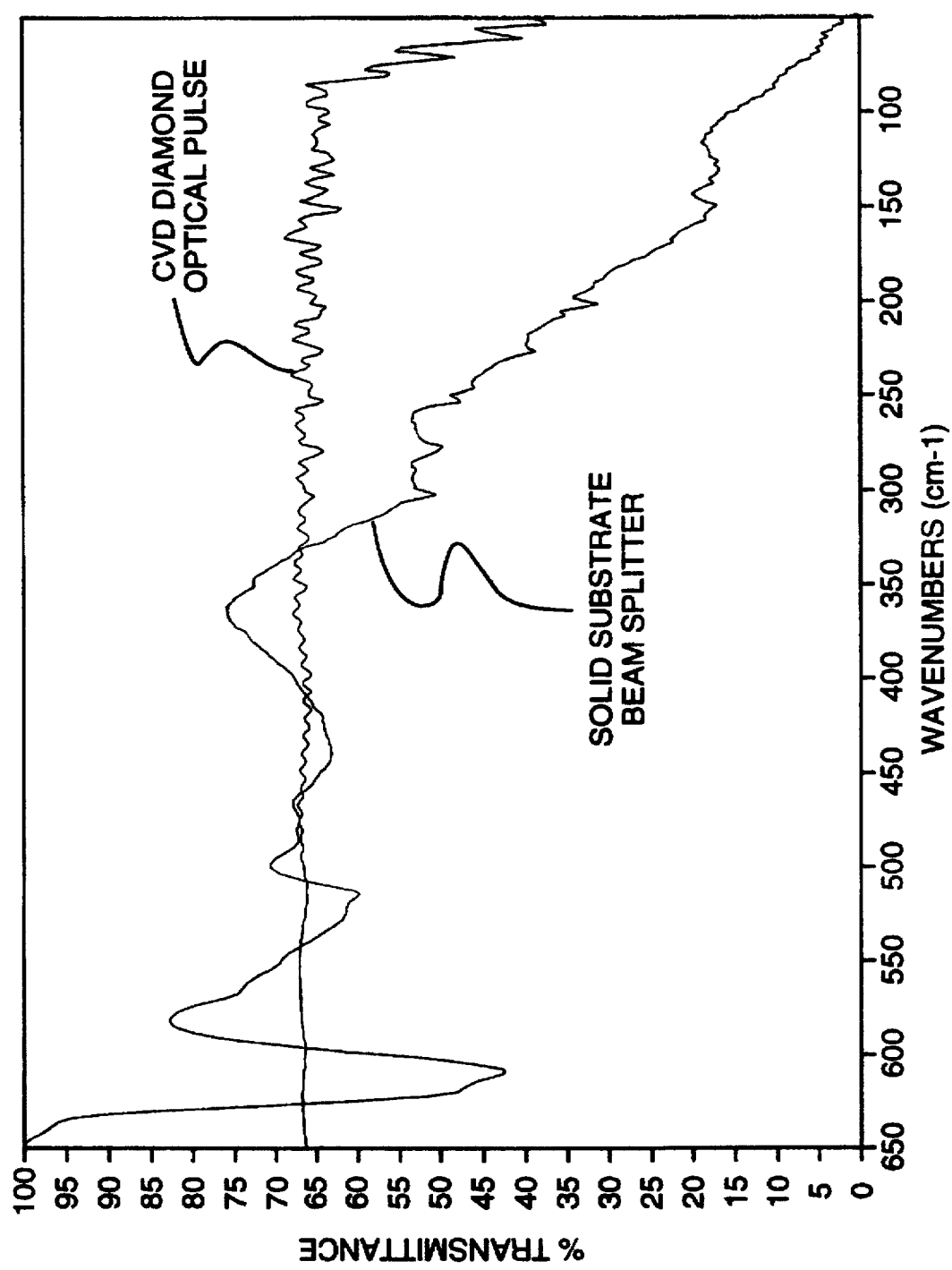
FIG. 4 is a graph showing transmittance values for a synthetic diamond optical plate in accordance with this invention and comparable transmittance values for a conventional infrared beamsplitter.

By way of example and not limitation, a representative example of beamsplitter 100 comprising the CVD diamond optical plate 105 in accordance with this invention was fabricated having a thickness of 300 µm±10 µm, and was polished so as to have a polish roughness of 25 nm (providing an optically clear sample in the visible range). Beamsplitter 100 fabricated as noted above was tested to determine optically characteristics of the device, such as transmittance. FIG. 4 is a graphic presentation of the transmittance values of the synthetic diamond optical plate of the present invention over the indicated wavenumbers; as can be seen, from radiation having a wavenumber of about 100 to radiation with a wavenumber of about 650, the diamond optical plate exhibited nearly uniform transmittance of about 65%. By contrast, the single beam spectrum for a commercially available far-infrared beamsplitter (the Nicolet "Solid Substrate®" beamsplitter) that is mounted in the interferometer is also presented.

Figure 3:
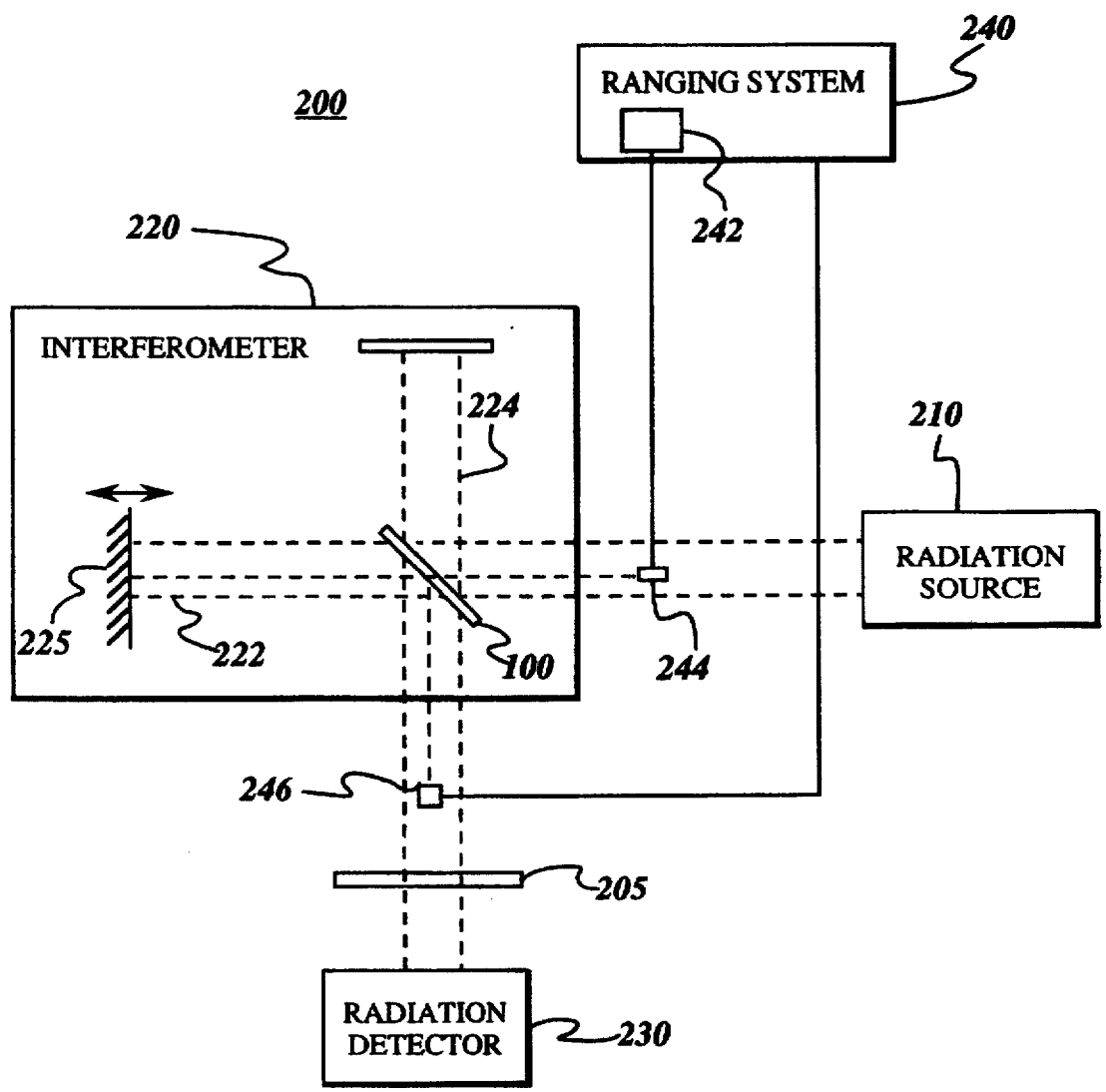
FIG. 3 is a schematic view of an interferometric spectroscopic system having a beamsplitter in accordance with the present invention.

Synthetic diamond beamsplitter 100 is desirably used, for example, in an interferometric spectroscopy system 200, as is shown in block diagram form in FIG. 3. By way of example and not limitation, spectroscopy system 200 typically comprises a radiation source 210 that is used to generate radiation of desired wavelength for conducting the analysis of a sample material 205. The radiation source is coupled to an interferometer 220 in which beamsplitter 100 is disposed to direct the incident radiation beam between a direct path 222 and a deflection path 224; along one of the paths (direct path 222 as illustrated in the FIG. 3), with a movable reflector 225 is disposed to control the respective path length and provide the basis for the interferometric measurements. The radiation beam is detected by a detector assembly 230 to provide determination of the interference patterns generated by interferometer 220. Spectroscopy system 200 further comprises a ranging system 240 that includes a laser source 242 coupled to a laser beam alignment piece 244 so as to direct the laser beam through beamsplitter 100 onto movable reflector 225. A laser beam detector module 246 is disposed to receive a portion of the laser beam reflected from movable reflector 225. Detector module is coupled to ranging system 240 to provide an input signal such that the laser beam is used to determine precisely the position of movable reflector 225. The precise location of various components, such as the path of the ranging laser, vary according to the design of the particular interferometer.

Beamsplitter 100 utilized in spectroscopy system 200 can be optimized for use with a particular ranging system 240 with the inclusion of an alignment port 150 extending between the first and second surfaces of optical plate 105. The alignment port is a small (typically less than about 5% of the surface area of the beamsplitter, and commonly having dimensions of about less than 2 cm on a side) and comprises a material adapted for beamsplitting radiation of the frequency of the laser beam used in ranging system of spectroscopy system 200. One example of laser source 242 is a helium neon laser having a wavelength of about 632.8 nm. In the event the diamond is of sufficient optical clarity (given the design parameters of the system), the diamond material may further comprise the laser beamsplitter (that is, a different type of material specifically adapted for beamsplitting at the laser wavelength is not required in alignment port 150). A dielectric coating disposed on diamond optical plate in the region defined by alignment port 150 provides enhanced reflectivity at the laser wavelength. In an alternative embodiment, alignment port comprises a dielectric coated glass plate with reflection and transmission properties adapted to provide optimum beamsplitting capabilities at the laser wavelength.

Figure 5:
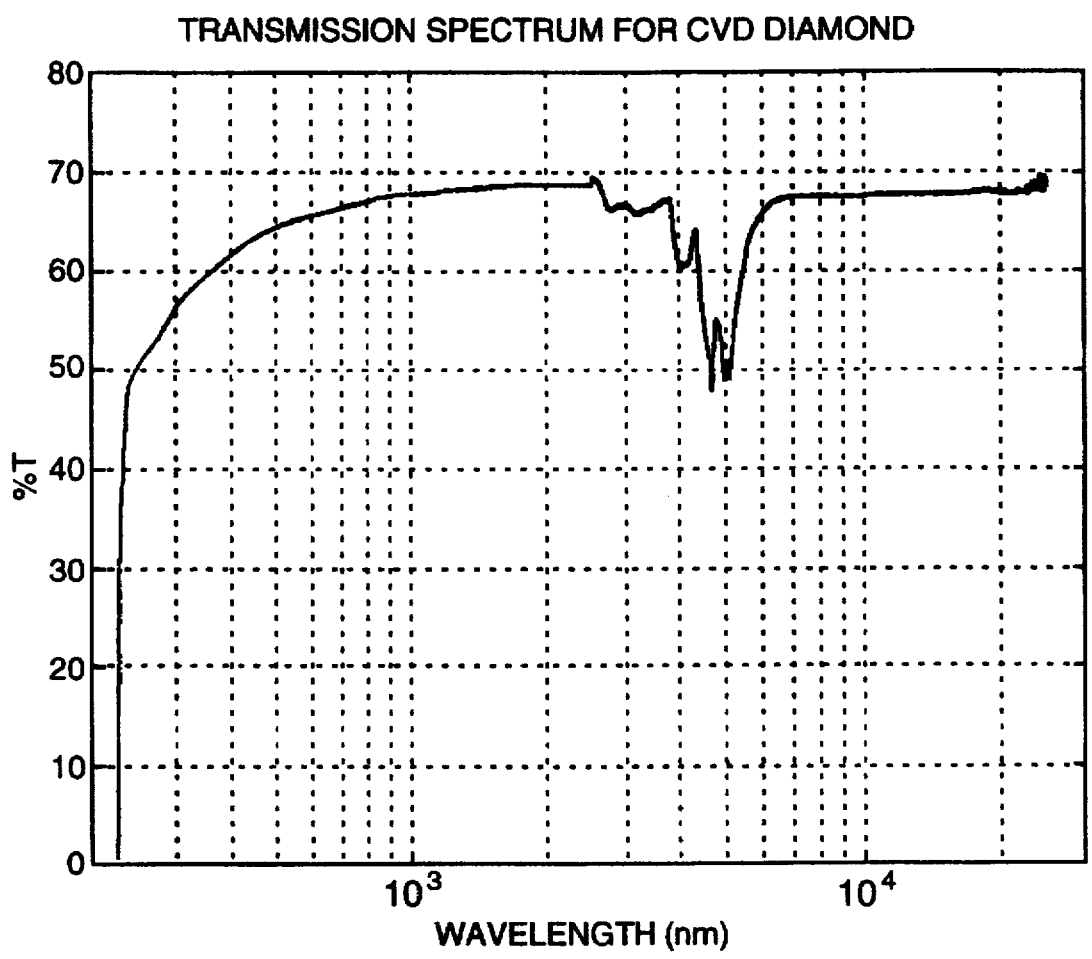
FIG. 5 is a graph showing a transmission spectrum for CVD diamond.

As noted above, synthetic diamond beamsplitter 100 in accordance with this invention provides stable transmittance values across a broad spectrum of incident radiation from the infrared into the visible range. In particular, FIG. 5 is a graph showing a transmission spectrum for CVD diamond across a range of radiation wavelengths. Given the desirable optical characteristics evidenced across this wavelength spectrum, the synthetic diamond optical plate in accordance with this invention is adapted to use as a beamsplitter across a range of incident radiation from the infrared and into the visible range.

In addition to the desirable optical transmission characteristics, beamsplitter 100 comprising synthetic diamond optical plate in accordance with this invention is dimensionally stable and mechanically rugged (e.g., the synthetic diamond material comprising optical plate 105 in accordance with this invention has a Youngs modulus of 1150 gigapascals and a burst strength of 150,000 psi. This structural robustness is desirable as it lessens the chance of damage to the beamsplitter during normal handling, enables the use of an alignment port for a spectroscopy unit ranging system without making the beamsplitter particularly fragile, and essentially obviates adverse reaction of the beamsplitter with environmental factors such as humidity, temperature, and the like.

The monolithic diamond structure comprising optical plate 105, by virtue of its refractive index, provides the beam splitting capabilities exploited by this invention at ratios as described above. As is known in the art, additional coatings disposed on the optical face of the diamond can serve to increase reflection to adjust the reflection/transmission ratio to desired value for a particular use, such as 50:50.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A beamsplitter for transmitting a first portion of a beam of incident radiation along a first path and reflecting a second portion of said beam of incident radiation along a second path, said beamsplitter comprising a robust free-standing monolithic synthetic polycrystalline diamond optical plate;

said optical plate having a thickness in the range between about 1 µm and about 1 mm and further having a transmittance in the range between about 55% and about 75% for incident radiation having a wavenumber in the range between about 100 and about 2100.

2. The beamsplitter of claim 1 wherein said diamond optical plate has a transmittance in the range between 60% and 70% for incident radiation having a wavenumber in the range between about 100 and about 2100.

3. The beamsplitter of claim 1 wherein the area of said optical plate is in the range between about 4 cm$^2$ and 50 cm$^2$.

4. The beamsplitter of claim 1 wherein said optical plate further comprises a first surface and a second surface disposed opposite to said first surface, said first surface being disposed at an offset angle with respect to said second surface, said offset angle being in the range between about 3° and about 5°.

5. The beamsplitter of claim 1 wherein said optical plate has a transmittance in the range of between about 65% and 75% for incident radiation having a wavenumber in the range between about 2100 and 25,000.

6. The beamsplitter of claim 1 wherein said synthetic diamond material comprises a chemical vapor deposition polycrystalline diamond film.

* * * * *